June 13, 1967
R. R. BAUER ET AL
3,324,960
WEIGHING MECHANISM FOR CONVEYOR
Filed July 19, 1965
4 Sheets-Sheet 1
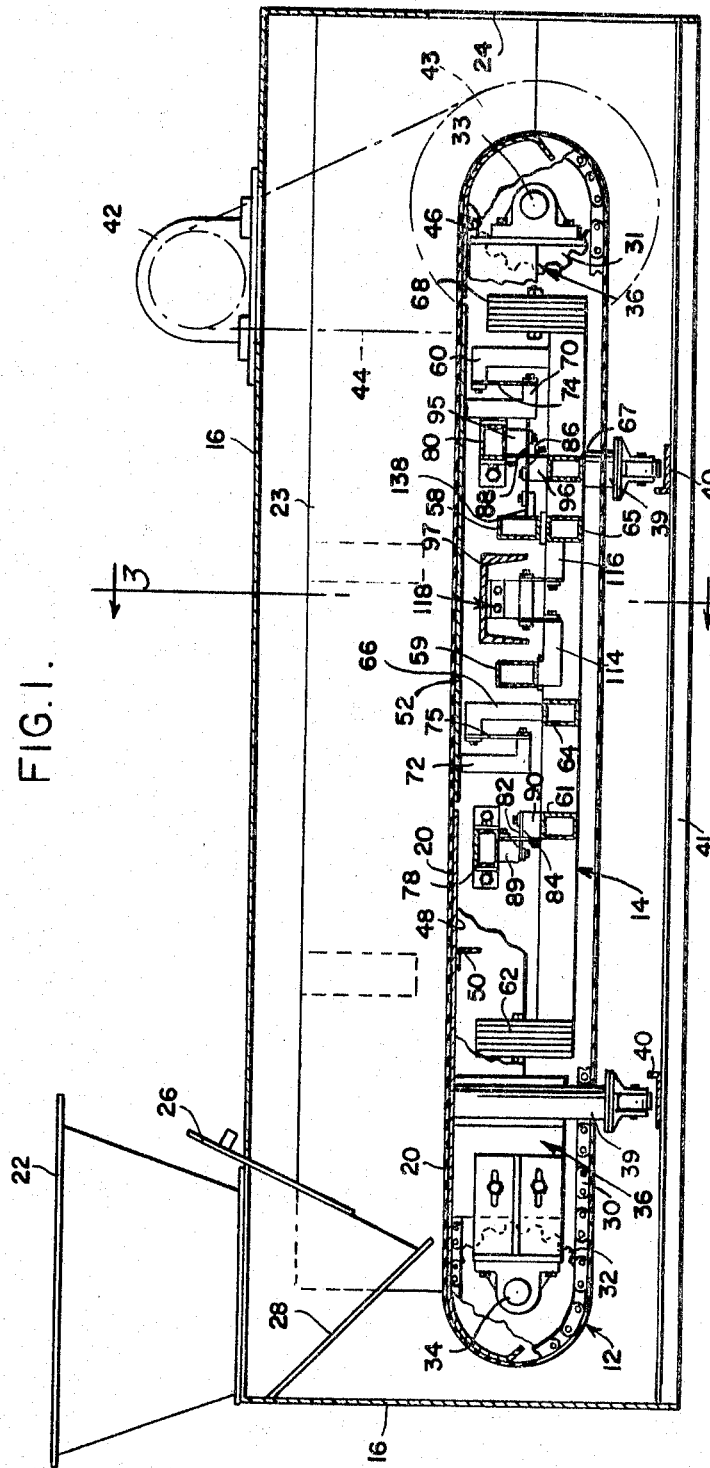
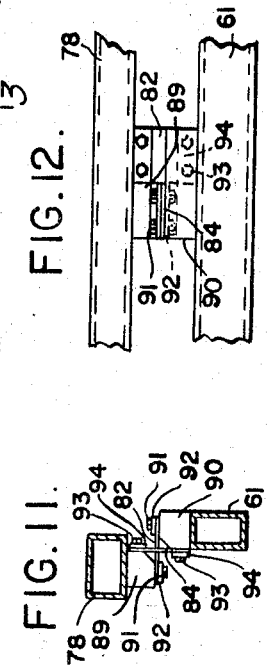

United States Patent Office 3,324,960
Patented June 13, 1967

3,324,960
WEIGHING MECHANISM FOR CONVEYOR
Robert R. Bauer, New Berlin, Bert Krivec, West Allis, and Thomas J. Stencel, Waukesha, Wis., assignors to Rex Chainbelt Inc., Milwaukee, Wis., a corporation of Wisconsin
Filed July 19, 1965, Ser. No. 473,025
18 Claims. (Cl. 177—16)

This invention relates to the weighing mechanisms of the weight sensing section of a weigh feeder of the belt conveyor type.

Such a weigh feeder includes a load sensing device associated with the weighing mechanism and means which integrates the indicated weight with respect to the operation of the belt conveyor to indicate the weight of material delivered. The weighing mechanism includes a platform which is disposed directly beneath the belt of a belt conveyor for continuously weighing material being conveyed thereby.

The weighing mechanism of the present invention comprises a weighing platform suspended from a pair of coplanar interfitting lever frames which, in turn, are suspended from the conveyor frame. The lever frames are disposed below the weighing platform and are centrally connected to a transverse weigh beam disposed between the weighing platform and the lever frames. The weigh beam is connected to a single load sensing device.

The load sensing device comprises a load cell which requires very little deflection to register through its full range so that the various members of the mechanism require very little movement and may be suspended by means of different combinations of horizontal and vertical rectangular biflexural plates which are respectively bendable about their median, transverse axes. These biflexural plates allow the necessary small amount of movement of the weighing mechanism to properly operate the type of load sensing device described.

The principal object of the present invention is to provide a weighing mechanism of such sturdiness that will efficiently and accurately weigh widely varying loads travelling on the conveyor belt.

A more particular object of the present invention is to provide a weighing mechanism which is substantially rigid enough to withstand rough usage and at the same time sensitive enough to record small changes in the load carried by the belt conveyor.

A more particular object of the invention also is to provide for the uniform support of the four corners of the plate with a suspension of such rigidity that a given small deflection of the plate by a load carried at any point on the plate applies the same force to the load sensing device.

Another object of the invention is to provide a mechanism which prevents horizontal loads from being applied to the load sensing device.

Another object of the invention is to provide a mechanism which is compart so as to fit between the upper and lower runs of the belt conveyor and immediate to the discharge end of the belt where required.

A further object is to provide a suspension system having a lower profile so that the required spacing between the upper and lower runs of the belt allows the use of a drive sprocket of a smaller diameter at the discharge end of the belt.

The drawings furnished herewith illustrate the best mode of carrying out the invention as presently contemplated and set forth hereinafter.

In the drawings:

FIGURE 1 is a side elevational view of the weigh feeder with parts removed and broken away;

FIG. 5 is an enlarged cross section taken transversely of the weigh beam and along the line 5—5 of FIG. 2;

FIG. 6 is an elevational view of the parts shown in FIG. 5 with the weigh beam broken away and sectioned;

FIG. 7 is an enlarged fragmentary, side elevational view showing the weighing platform suspended from a lever frame;

FIG. 8 is a fragmentary side elevational view of the feeder and an end elevation of the weigh beam;

FIG. 9 is an enlarged, fragmentary view showing the connection of the weigh beam to the conveyor frame;

FIG. 10 is an enlarged end elevation of the weigh beam;

FIG. 11 is an enlarged cross sectional view taken along line 11—11 of FIG. 2 to show one pair of the biflexural plates; and FIG. 12 is an elevational view of the parts shown in FIG. 11.

Figure 2:
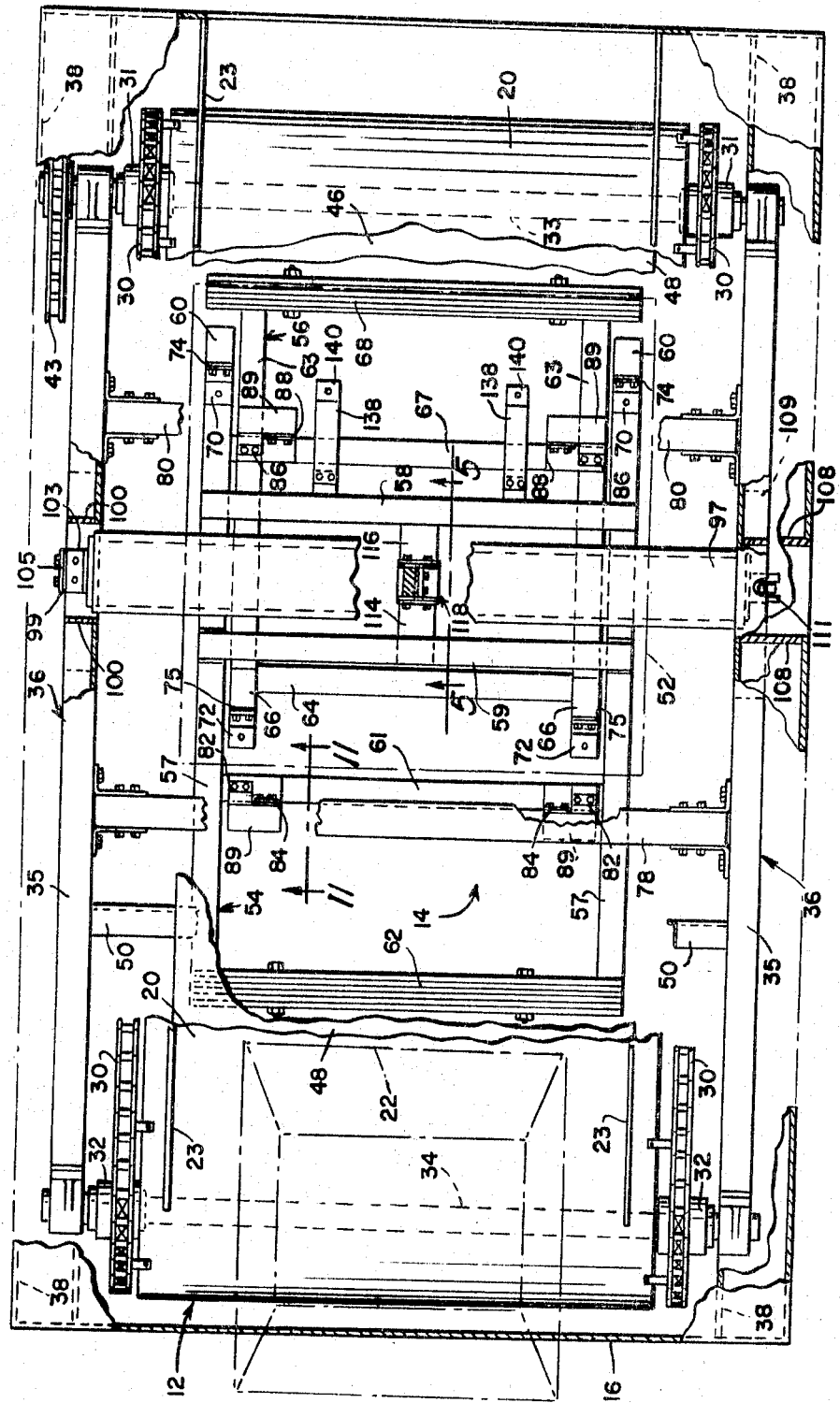
FIG. 2 is a plan view of the weigh feeder with parts thereof removed and broken away. The weighing platform is removed and its outline is shown in phantom lines to show its location relative to the general structure of the weight sensing section.
Figure 3:
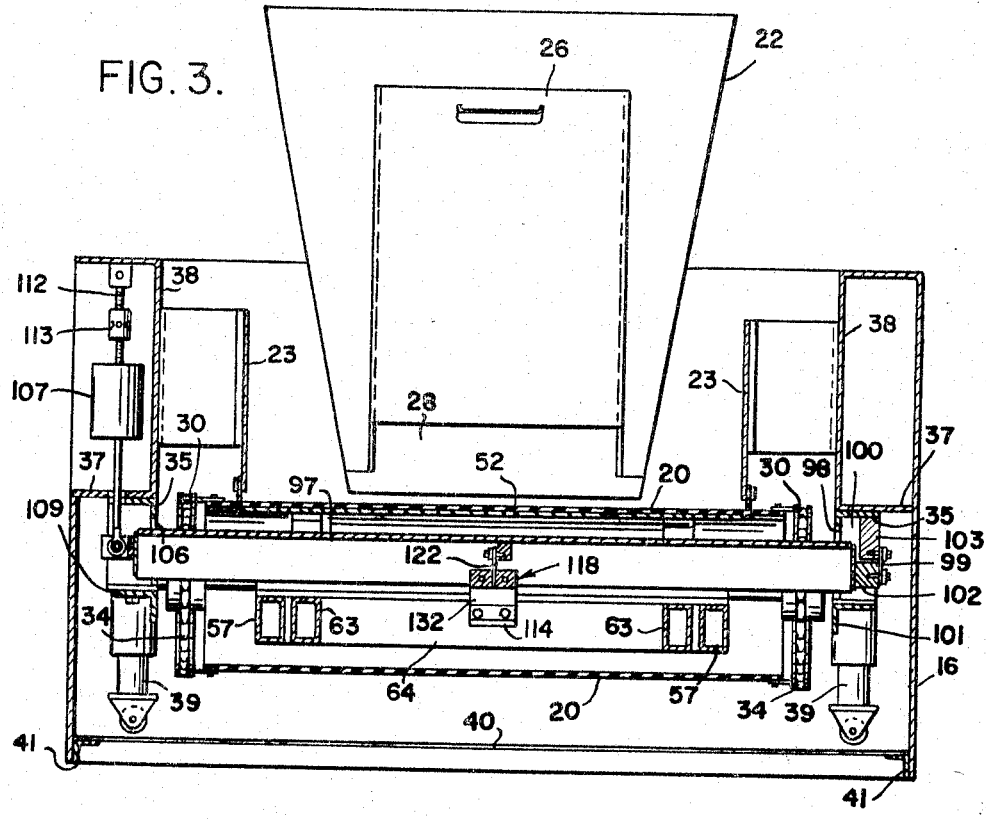
FIG. 3 is a transverse, vertical cross section taken on lines 3—3 of FIGURE 1.

As shown particularly in FIGURES 1 and 2, the weigh feeder includes the belt conveyor 12 and the weighing device 14 enclosed together in the housing 16. Material is fed onto the endless belt 20 of conveyor 12 through the loading hopper 22 at one end of housing 16 and the loading end of the conveyor 12. The material is carried on the belt 20 between but without contacting sideboards 23 and is discharged at the other end of housing 16 through the opening 24 in the housing 16. The discharge of material from the hopper 22 onto the conveyor 12 is controlled by the vertically adjustable plate 26. The lower end of the plate 28 forming the bottom of hopper 22 extends forwardly of the lower edge of adjustable plate 26 so that the column of material in the hopper 22 is not supported in any part by the belt 20.

Belt 20 is driven by a chain 30 attached to each edge of the belt. The two chains 30 are driven by the head sprockets 31 disposed at the discharge end of the conveyor 12 and operate over the tail sprockets 32 disposed at the loading end of the conveyor 12. Sprockets 31 and the chains 30 provide a positive drive of the belt 20. The sprockets 31 and 32 are respectively fixed to shafts 33 and 34 which are journally carried by the side members 35 of conveyor frame 36. One end of shaft 33 is fitted with the driven sprocket 43. In the preferred embodiment of the present invention, the conveyor frame 36 is bolted, as a unit, to the reinforcing shelf 37 joining the interior partition 38 and the sides of the housing 16. When the conveyor frame 36 is unbolted from the shelf 37 the conveyor 12 including the weighing device 14 is then supported by the castered legs 39 on guideways 40 so that the conveyor can be removed from the housing 16. The transverse braces 41 are fixed adjacent to the lower edges of the opposite sides of housing 16 and carry the respective ends of the guideways 40. When installed in housing 16, conveyor 12 is driven by the motor 42 carried on top of housing 16 at the discharge end of conveyor 12 and operatively connected to sprocket 43 by power transmission chain 44.

The upper run of the belt 20 is supported in part on the forward and rear slider decks 46 and 48 respectively which are fixed to the crossbars 50 of the conveyor frame 36. The opposite ends of the respective decks 46 and 48 are semi-cylindrical to guide the belt 20 as it changes direction at the opposite ends of conveyor 12. Sprockets 32 are adjustable and deck 48 is longitudinally movable to provide proper tensioning of belt 20.

The weighing device 14, also referred to as the weight sensing section of the conveyor 12, includes a rigid rectangular weighing platform 52 positioned between the adjacent ends of the decks 46 and 48. The corresponding adjacent ends of decks 46 and 48 and platform 52 have only small intermediate spacings and the weighing platform 52 is disposed only slightly above the horizontal plane of decks 46 and 48 as will be described.

Disposed beneath platform 52 are the rigid, coplanar, interfitting, generally rectangular first and second lever frames 54 and 56. Lever frame 54 includes the side bars 57 which are joined by the cross members 58 and 59. The end of each side bar 57 nearer the discharge end of the conveyor carries an inverted L-shaped bracket 60. The support crossbar 61 connects side bars 57 nearer their other ends which carry the counterweights 62.

Figure 4:
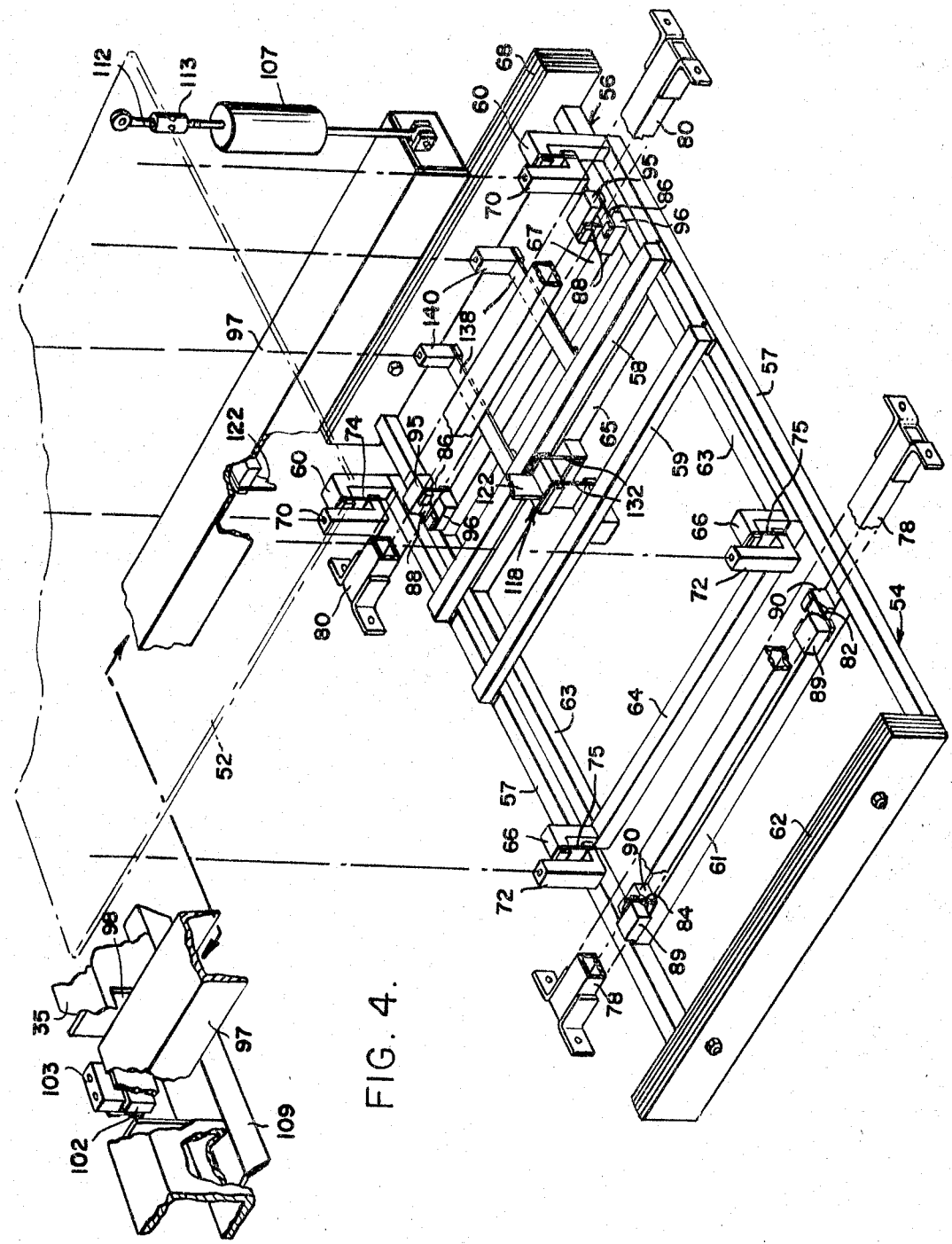
FIG. 4 is an enlarged and exploded view of the weight sensing section shown in FIG. 1 and FIG. 2.

As shown in FIG. 4, the smaller, inner frame 56 extends between side bars 57 and and below cross members 58 and 59 of frame 54. Frame 56 includes the side bars 63 and the connecting cross member 65. The end of each side bar 63 nearer the loading end of the conveyor is provided with an inverted L-shaped bracket 66. The support crossbar 67 connects side bars 63 nearer their other ends which carry the counterweight 68.

The L-shaped brackets 70 and 72 are rigidly fixed to the underside of platform 52. Their lower ends are respectively connected to the upper ends of the brackets 60 and 66 by the biflexural suspension plates 74 and 75. Platform 52 and lever frames 54 and 56 are arranged so that a bracket 70 is located near each of the two corners at the end of the platform nearer the discharge end of the conveyor and so that a bracket 72 is located near each of the two corners at the end of the platform nearer the loading end of the conveyor. For convenience the lower ends of brackets 72 and 70 may be referred to respectively as the first and second ends of platform 52, having reference to the direction of travel of belt 20 over the platform. Similarly, the upper ends of brackets 66 and 60 may be conveniently referred to as the ends of first and second lever frames 56 and 54, respectively. Referring to FIG. 7 the ends of the suspension plates 74 are clamped by the bolts 76 between the bearing plates 77 and the respective ends of the corresponding brackets 60 and 70, and the suspension plates 74 are similarly fastened to the corresponding brackets 66 and 72. The biflexural plates 74 and 75 are aligned so that they lie in parallel vertical planes which are transverse respecting the direction of travel of belt 20.

The first and second cross members 78 and 80 are connected to the side members 35 of conveyor frame 36 and respectively carry the second correspondingly opposite ends of lever frames 54 and 56 by means of laterally aligned pairs of horizontal and vertical juxtaposed, biflexural, fulcrum plates 82 and 84 and 86 and 88, respectively. The hypothetical points of intersection of the fulcrum plates 82 and 84 and of the plates 86 and 88 represent fixed axes about which the lever frames are allowed to rotate and insure the constant axis of rotation for said lever frames which is essential to the accuracy of the weighing device 14.

Referring to FIGS. 12 and 11, the mounting blocks 89 and 90 are fixed to the underside of cross member 78 and to the top side of crossbar 61 respectively. The opposite ends of plate 82 are respectively clamped by bolts 91 between the bearing plates 92 and the bottom and top of the mounting blocks 89 and 90. Each end of plate 84 is clamped by bolts 93 between the bearing plate 94 and the vertical surfaces of the mounting blocks 89 and 90 respectively. Each pair of plates 86 and 88 are similarly secured to the mounting blocks 95 and 96 which are respectively fixed to the cross member 80 and crossbar 67.

The weigh beam 97 is disposed below the platform 52 and above the interfitting lever frames 54 and 56 and extends transversely of the longitudinal center line of the belt 20. One end of the weigh beam 97 extends through opening 98 in the side member 35 of conveyor frame 36 and is connected to the side member 35 by means of the vertical biflexural plate 99 to allow the weigh beam 97 a limited degree of pivotal movement about an axis parallel to the center line of belt 20. The side member 35 is reinforced at the opening 98 by the plate 100 fixed to member 35 adjacent to the vertical margins of opening 98 and by the angle plate 101 fixed to the underside of member 35 to define the lower margin of opening 98, as shown in FIGS. 9 and 10. Referring to FIG. 9, the blocks 102 and 103 are respectively connected to the weigh beam 97 and the side member 35 of the conveyor frame 36. The ends of the biflexural plate 99 are clamped by bolts 104 between the bearing plate 105 and the respective backing blocks 102 and 103.

The other end of the weigh beam 97 extends through opening 106 in the opposite side member 35 and is universally connected to the load sensing device 107 pivotally carried by housing 16, as shown in FIG. 8. The side member 35 is reinforced at the opening 106 by the rib plates 108 fixed to side member 35 adjacent to the vertical margins of opening 106 and by the angle plate 109 fixed to the underside of member 35 to define the lower margin of opening 106, as shown in FIG. 8. The load sensing device 107 is disposed between the housing 16 and the interior partition 38 as are the plates 108 which reinforce the housing 16 at that point. The portion of housing 16 in front of device 107 may be removed completely as shown or be replaced with a removable panel (not shown) for easy access to the load sensing device 107. The lower rod of load sensing device 107 passes through hole 110 in housing 16 and notch 111 in side member 35 of conveyor frame 36. The upper rod 112 of load sensing device 107 comprises two parts connected by a turnbuckle 113 which allows a limited degree of adjustment of the height of platform 52.

The cross members 59 and 65 carry mounting pads 114 and 116 respectively disposed in the same horizontal plane and aligned in the direction of belt travel. The lever frames 54 and 56 are connected to the weigh beam 97 by means of a universally flexible device 118. Referring to FIGS. 5 and 6, the universally flexible device 118 comprises a mounting block 120 transverse of and fixed to the weigh beam 97. One end of biflexural plate 122 is clamped by bolts 124 between bearing plate 126 and block 120. The other end of plate 122 is clamped by bolts 128 between the blocks 130. A pair of biflexural plates 132 are each clamped at their ends by bolts 134 between the bearing plates 136 and opposite ends of blocks 130 so that they extend downwardly and are perpendicular to the plate 122. The other ends of plates 132 are clamped by bolts 134 between the bearing plates 136 and the respective mounting pads 114 and 116. In this manner the weigh beam 97 is afforded a certain degree of flexibility without impairment of its accuracy.

The friction of the belt 20 moving over platform 52 acts in a horizantal plane and tends to move platform 52 in the direction of belt travel. Stabilization of the platform 52 in the horizontal plane is accomplished by the laterally spaced, horizontal, relatively long stay plates 138 which connect the stay brackets 140 carried by the underside of the platform 52 and the cross member 58 of the outer lever frame 56. Platform 52 is rigidly secured against any lateral movement and is rigidly supported vertically in that virtually no vertical movement of any side or corner of the platform is allowed except with a corresponding movement of the other sides of corners of the platform. Additionally, within the range of movement required for the load sensing device 107, the weighing mechanism is substantialy "friction free." That is, the bending resistance of the biflexural plates connecting the lever frames with the platform and with the conveyor frame is nil for all practical purposes. The extreme rigidity of the mechanism prevents any possibility that spurious vibration or oscillations can develop which may affect the accuracy of the weight sensing device. With such rigidity, the weight of the moving parts of the mechanism, including the counterweights where employed, is not a disadvantage and such weight is instead, of advantage in damping the movement of the mechanism in response to normal variations in the weight of the material on the belt.

According to the invention, the suspension plates 74, stay plates 138 and plates 132 are located substantially in the plane defined by the horizontal, parallel intersecting axes of the biflexural plates 82, 84, 86 and 88. Since lever frames 54 and 56 pivot about their respective transverse axes, their free ends move in arcuate paths and the distance between brackets 60 and 66 is theoretically subject to change. However, because of the small amplitude of movement required for operating the load sensing device 107, and the flexibility of suspension plates 75 there is no mechanical interference between lever frames 54 and 56.

The extreme rigidity provided allows the use of a load sensing device having only a few thousandths of an inch of movement between zero and full scale weights and requires a platform movement also of only a few thousandths of an inch. That is, the lever ratio between platform 52 and the end of weigh beam 97 is nearly unity. The small vertical range of movement of platform 52 allows the spacing between the platform and the slider decks 46 and 48 to be reduced to a minimum, or in the order of a fraction of an inch so that the variable bridging effect of the belt and material is reduced to a minimum and, particularly, to a quantitative value which is a small fraction of the required accuracy.

That is and as is known, the length of the belt and the length of the piled material thereon actually supported by the platform of a weigh feeder of the belt conveyor type varies whenever the platform or either end or corner thereof moves up or down or, excepting in one case only, whenever the tension of the belt changes. That one case is when the platform is in perfect alignment with the slider deck. The varying length described is referred to as the effective length of the platform and such variations are a principal source or cause of inaccuracy of weigh feeders. Prior weigh feeders of the belt conveyor type are incapable of ninety-eight percent accuracy whereas the accuracies of over ninety-nine and three-quarters percent are possible with the present invention.

Such accuracies are achieved despite the small spacing between the platform and dead plates and only with the absolute rigidity of the platform which is provided prevents any tilting of the platform under any operating circumstances. Such circumstances is most generally the location of the material or of larger pieces at one side or the other on the belt.

It should also be noted that the mechanism of the present invention is and must be fitted within the relatively narrow space available between the upper and lower runs of conveyor belt 20. The space is narrow because of the low profile generally required because the feeder is charged and discharged by gravity and is interposed between other equipment. Accordingly, the pulleys over which the belt operates may be of a small diameter relative to the size of pulley which might otherwise be required.

The conveyor belt 20 shown is of multiple-ply, reinforced rubber construction but may in instances instead be a metal belt or a segmented belt or a series of overlapping pans.

Reference has been made to the spacing or gaps between the decks 46 and 48 and platform 52. The length of the belt and the material thereon actually supported by the platform and being weighed is referred to as the "weigh length" and is roughly the distance between the centers of the gaps referred to. Such weigh length, however, may be considerably varied by any uneven bridging of the gap by the material on the belt and also by the bridging effect of the belt. A narrow gap and a stiff belt minimize the variations due to the bridging effect of the material, but a narrow gap and a stiff belt do not minimize the variations due to bridging of the gap by the belt itself.

Where the gap is, for example, only several times the thickness of the belt, the elevation of the platform relative to that of the decks becomes extremely critical due to the fact that a length of the belt will be lifted from the deck or platform, whichever is lower. Depending upon the degree of belt tension, the "weigh length" will be greater if the platform is higher or less if the decks are higher.

Some difference in elevation is unavoidable because the platform must have some movement downwardly or excursion to provide an indication of weight. The rigidity of the mechanism of the present invention allows the use of a mechanical ratio such that platform 52 has an excursion of only one or two hundredths of an inch.

With an excursion of no more than that indicated, platform 52 may be adjusted so that at full scale, that is, when supporting the maximum weight intended, the platform is in alignment with decks 46 and 48 and when supporting no material weight, the platform is elevated to the extent indicated. Accordingly, as the material weight increases from zero to maximum or full scale, and while the belt tension increases correspondingly, the weigh length of the belt decreases only slightly if at all and to the extent that a given compensation in the system registering the weight will be entirely adequate for a wide range of weights and materials.

Various modes of carrying out the invention are contemplated as within the scope of the following claims particularly pointing out and distinctly claiming subject matter which is regarded as the invention.

We claim:

1. In a weigh feeder comprising a belt conveyor having loading and discharge ends and a weighing system continuously indicating the weight of a given section of the material being conveyed, a conveyor housing having spaced, coplanar fixed horizontal slider decks and endless belt operating thereover, a rectangular weighing platform intermediate said decks and having a rigid depending bracket at each corner thereof, the corresponding edges of said platform and decks being in closely spaced parallel relation, the two pairs of brackets which are respectively nearer the loading and discharge ends of the conveyor being the first and second ends of said platform, a frame fixed to said housing and having first and second cross members respectively nearer the discharge and loading ends of the conveyor and extending beneath said decks and platform, a weigh beam intermediate said cross members and beneath said platform and having pivotal flexure plates connecting one end thereof and one side of said frame and a weight sensing device connecting the other end thereof and the other side of said frame, first and second rectangular rigid interfitting lever frames extending beneath said weigh beam, fulcrum and suspension flexure plates respectively connecting said lever frames with the corresponding cross members and ends of said platform, and adjacent flexure plates respectively connecting said beam and said lever frame so that an increase in weight of the material on said platform decreases the weight supported by the fulcrum plates, the mechanical lever ratio of said weigh beam being the reciprocal of that of said said lever frames whereby the vertical excursion of the platform is precisely the same at each corner thereof and is approximately that of the weight sensing device.

2. A weigh feeder comprising a belt conveyor having loading and discharge ends and a weighing system continuously indicating the weight of a given section of the material being conveyed, said conveyor including a frame having spaced first and second cross members respectively nearer the discharge and loading ends of the conveyor and having spaced, coplanar fixed horizontal slider decks and an intermediate rectangular platform, an endless belt operating longitudinally over said decks and platform, the corresponding edges of said decks and platform being in closely spaced parallel relation, having a rigid depending bracket at each corner thereof, the two brackets at each end of the platform which are respectively nearer the loading and discharge ends of the conveyor being the first and second ends of said platform, a weigh beam intermediate said cross members and beneath said platform and having pivotal flexure plates connecting one end thereof and one side of said conveyor frame and a weight sensing device connecting the other end thereof and the other side of said conveyor frame, first and second rectangular rigid interfitting lever frames extending beneath said weigh beam, fulcrum and suspension flexure plates respectively connecting said frames with the corresponding cross members and ends of said platform and interconnected pivotal and suspension plates respectively connected to said beam and said lever frames, said pivotal flexure plates having longitudinal bending axes, said suspension and fulcrum flexure plates having transverse bending axes and with said lever frames providing the lateral rigidity of the weighing platform independently of said weigh beam.

3. The combination of a belt conveyor having loading and discharge ends and a weighing system continuously indicating the weight of a given section of the material being conveyed which comprises, a conveyor frame having spaced, coplanar fixed horizontal slider decks, an endless belt operating longitudinally thereover, a rectangular weighing platform intermediate said decks and having a rigid depending bracket at each corner thereof, the corresponding edges of said platform and decks being in closely spaced parallel relation, the lower ends of the two brackets nearer the loading end of the conveyor being the first end of said platform and the lower ends of the other two brackets being the second end of said platform, spaced first and second cross members respectively nearer the discharge and loading ends of the conveyor and extending beneath said decks and platform and having ends fixed to the sides of said conveyor frame, a weigh beam intermediate said cross members and beneath said platform and having pivotal flexure plates connecting one end thereof and one side of said conveyor frame and a weight sensing device connecting the other end thereof and the other side of said conveyor frame, first and second, rectangular rigid interfitting lever frames extending beneath said weigh beam, fulcrum and suspension flexure plates respectively connecting said frames with the first and second cross members and first and second ends of said platform and interconnected pivotal and first and second suspension flexure plates respectively connected to the center of said beam and the geometric centers of said lever frames, said pivotal flexure plates having longitudinal bending axes, said suspension and fulcrum flexure plates having transverse bending axes and with said lever frames providing the lateral rigidity of the weighing platform independently of said weigh beam, the suspension and fulcrum flexure plates of said second lever frame including pairs of such plates lying in a horizontal plane and with said second lever frame providing the longitudinal securement of said platform relative to the conveyor frame.

4. In a weigh feeder comprising a belt conveyor having loading and discharge ends and a weighing system continuously indicating the weight of a given section of the material being conveyed, a conveyor belt, a rectangular weighing platform supporting a section of said belt and having a rigid depending bracket at each corner thereof, the lower ends of the two brackets nearer the loading end of the conveyor being the first end of said platform and the lower ends of the other two brackets being the second end of said platform, spaced first and second cross members respectively nearer the discharge and loading ends of the conveyor and extending beneath said platform, a weigh beam intermediate said cross members and beneath said platform having a pivotal support at one end thereof and a weight sensing device connected to the other end thereof, first and second, rectangular rigid interfitting lever frames extending beneath said weigh beam, fulcrum and suspension flexure plates respectively connecting said frames with the first and second cross members and ends of said platform and interconnected pivotal and first and second suspension flexure plates respectively connected to the center of said beam and the geometric centers of said lever frames, said pivotal flexure plates having longitudinal bending axes, said suspension and fulcrum flexure plates having transverse bending axes and with said lever frames providing the lateral rigidity of the weighing platform independently of said weigh beam and said plates providing the limited pivotal movement required to allow the weight of the material on the belt supported by the platform to be applied to the weight sensing device through the weigh beam.

5. In a weigh feeder comprising a belt conveyor having loading and discharge ends and a weighing system continuously indicating the weight of a given section of the material being conveyed, a conveyor frame having spaced, coplanar fixed horizontal slider decks, an endless belt operating longitudinally thereover, a rectangular weighing platform intermediate said decks and having rigid depending brackets at each corner thereof, the corresponding edges of said platform and decks being in closely spaced parallel relation, the two brackets which are respectively nearer the loading and discharge ends of the conveyor being the first and second ends of said platform, spaced first and second cross members respectively nearer the discharge and loading ends of the conveyor and extending beneath said decks and platform and having ends fixed to the sides of said conveyor frame, a weigh beam intermediate said cross members and beneath said platform and having pivotal flexure plates connecting one end thereof and one side of said conveyor frame and a weight sensing device connecting the other end thereof and the other side of said conveyor frame, first and second, rectangular rigid interfitting lever frames extending beneath said weigh beam, fulcrum and suspension flexure plates respectively connecting said frames with the first and second cross members and first and second flexure plates respectively connected to the center of said beam and the geometric centers of said lever frames, said pivotal flexure plates having longitudinal bending axes, said suspension and fulcrum flexure plates having transverse bending axes and with said lever frames providing the lateral rigidity of the weighing platform independently of said weigh beam.

6. In a weight feeder comprising a belt conveyor having loading and discharge ends and a weighing system continuously indicating the weight of a given section of the material being conveyed, a conveyor frame having spaced, coplanar fixed horizontal slider decks, an endless belt operating longitudinally thereover, a rectangular weight platform intermediate said decks and having lower first and second ends which are respectively nearer the loading and discharge ends of the conveyor and corresponding edges which are in closely spaced parallel relation to the adjacent edges of said deck, first and second cross members respectively nearer the discharge and loading ends of the conveyor and extending beneath said decks and platform and having ends fixed to the sides of said conveyor frame, a weigh beam intermediate said cross members and beneath said platform and having pivotal flexure plates connecting one end thereof and one side of said conveyor frame and a weight sensing device connecting the other end thereof and the other side of said conveyor frame, first and second rectangular rigid interfitting lever frames extending beneath said weigh beam, fulcrum and suspension flexure plates respectively connecting said frames with the corresponding cross members and ends of said platform and interconnected pivotal and suspension flexure plates respectively connected to the center of said beam and the geometric centers of said lever frames.

7. In a weigh feeder comprising a belt conveyor having loading and discharge ends and a weighing system continuously indicating the weight of a given section of the material being conveyed, a conveyor frame having spaced, coplanar fixed horizontal slider decks, an endless belt operating longitudinally thereof, a rectangular weighing plaftorm intermediate said decks and having lower first and second ends respectively nearer the discharge and loading ends of the conveyor and extending beneath said decks and platform and having ends fixed to the sides of said conveyor frame, a weigh beam intermediate said cross members and beneath said platform and having one end pivotally connected to one side of said conveyor frame and a weight sensing device connecting the other end thereof and the other side of said conveyor frame, first and second, rectangular rigid interfitting lever frames extending beneath said weigh beam, fulcrum and suspension flexure plates respectively connecting said frames with the first and second cross members and ends of said platform and interconnected pivotal and suspension plates first and second flexure plates respectively connected to the center of said beam and the geometric centers of said lever frames, said pivotal flexure plates having longitudinal bending axes, said suspension and fulcrum flexure plates having transverse bending axes and with said lever frames providing the lateral rigidity of the weighing platform independently of said weigh beam.

8. In a weighing system for a belt conveyor feeder having a belt for conveying material from the loading end to the discharge end of the feeder, a horizontal platform for supporting a given section of said belt with material thereon and having first and second ends which are respectively nearer the loading and discharge ends of the feeder, first and second supporting cross members respectively nearer the discharge and loading ends of the conveyor and extending beneath said platform, a weigh beam intermediate said cross members and beneath said platform and having a pivotal flexure support plate at one end thereof and a weight sensing device at the other end thereof, first and second rectangular, rigid interfitting lever frames extending beneath said weigh beam, fulcrum and suspension flexure plates respectively connecting said frames with the first and second cross members and first and second ends of said platform, and interconnected pivotal and suspension first and second flexure plates connected to the center of said beam and the geometric centers of the respective lever frames, said pivotal flexure plates having longitudinal bending axes, said suspension and fulcrum flexure plates having transverse bending axes and with said lever frames providing the lateral rigidity of the weighing platform respecting said cross members.

9. In a weighing system including a horizontal platform for supporting a given section of a conveyor feeder belt, said platform having first and second ends over which the belt moves, fixed first and second supporting cross members below and respectively nearer the second and first ends of said platform, a weigh beam intermediate said cross members and beneath said platform and a pivotal flexure plate supporting one end thereof and a weight sensing device supporting the other end thereof, first and second rectangular, rigid interfitting lever frames extending beneath said weigh beam, fulcrum and suspension flexure plates respectively connecting said frames with the first and second cross members and first and second ends of said platform, and interconnected pivotal and suspension first and second flexure plates connected to the center of said beam and the geometric centers of the respective lever frames, said pivotal flexure plates having longitudinal bending axes, said suspension and fulcrum flexure plates having transverse bending axes and with said lever frames providing the lateral rigidity of the weighing platform respecting said cross members, the suspension and fulcrum flexure plates of said second lever frame including pairs of such plates lying in a horizontal plane and with said second lever frame providing the longitudinal securement of said platform relative to the conveyor frame.

10. In a weighing system including a horizontal platform for supporting a given section of a conveyor feeder belt, said platform having first and second ends over which the belt moves, fixed first and second supporting cross members below and respectively nearer the second and first ends of said platform, a weigh beam intermediate said cross members and beneath said platform and having pivotal means supporting one end thereof and a weight sensing device supporting the other end thereof, first and second rectangular, rigid interfitting lever frames extending beneath said weigh beam, fulcrum and suspension flexure plates respectively connecting said frames with the first and second cross members and first and second ends of said platform, and interconnected pivotal means connecting the center of said beam and the geometric centers of the respective lever frames, said suspension and fulcrum flexure plates having transverse bending axes and with said lever frames providing the lateral rigidity of the weighing platform respecting said cross members, the suspension and fulcrum flexure plates of said second lever frame including pairs of such plates lying in a horizontal plane and with said second lever frame providing the longitudinal securement of said platform relative to the conveyor frame.

11. In a weighing system including a weight sensing device and a horizontal platform for supporting a given section of a conveyor feeder belt, said platform having first and second ends over which the belt is to pass, fixed first and second supporting cross members below and respectively nearer the second and first ends of said platform, first and second rectangular, rigid interfitting lever frames extending beneath said platform, fulcrum and suspension flexure plates respectively connecting said frames with the first and second cross members and first and second ends of said platform, and interconnected pivotal means connecting the geometric centers of the respective lever frames and said weight sensing device, said suspension and fulcrum flexure plates having transverse bending axes and with said lever frames providing the lateral rigidity of the weighing platform respecting said cross members, the suspension and fulcrum flexure plates of said second lever frame including pairs of such plates lying in a horizontal plane and with said second lever frame providing the longitudinal securement of said platform relative to said cross members.

12. In a weighing system including a platform for supporting a given section of a conveyor feederbelt for conveying material from the loading end to the discharge end of the feeder, said platform having lower first and second ends which are respectively nearer the loading and discharge ends of the feeder, first and second supporting cross members respectively nearer the loading and discharge ends of the conveyor and extending beneath said platform, fulcrum and suspension flexure plates respectively connecting said frames with the first and second cross members and ends of said platform, and interconnected pivotal and suspension first and second flexure plates respectively connected to the geometric centers of said lever frames and said weight sensing device, said pivotal flexure plates having longitudinal bending axes, said suspension and fulcrum flexure plates having transverse bending axes and with said lever frames providing the lateral rigidity of the weighing platform respecting said cross members.

13. In a weighing system including a weight sensing device and a horizontal platform for supporting a given section of a conveyor feeder belt with said belt moving successively over the first and second ends of said platform, fixed first and second supporting cross members below and respectively nearer the second and first ends of said platform, first and second rectangular, rigid interfitting lever frames horizontally disposed beneath said platform, laterally spaced, horizontal, flexible fulcrum plates respectively connecting the oppositely disposed ends of said first and second lever frames and said first and second cross members, laterally spaced vertical, flexible suspension plates respectively connecting the oppositely disposed other ends of said first and second lever frames with the first and second ends of said platform, interconnected pivotal means connecting the geometric centers of the respective lever frames and said weight sensing device, said flexible suspension and fulcrum plates having transverse bending axes and with said lever frames providing the lateral rigidity of the weighing platform respecting said cross members, and flexible spaced, horizontal plates connecting the said other end of said second lever frame and the second end of said platform and providing the longitudinal securement of said platform relative to said cross members.

14. In a weighing system, a horizontal platform for supporting a given section of a conveyor feeder belt moving successively over the first and second ends of said platform, first and second rectangular, rigid interfitting lever frames horizontaly disposed beneath said platform, fixed supporting cross members having laterally spaced, horizontal, flexible fulcrum plates respectively connected to the oppositely disposed ends of said first and second lever frames, the oppositely disposed other ends of said first and second lever frames having laterally spaced vertical, flexible suspension plates respectively connected to the first and second ends of said platform, and weight sensing means pivotally connected to the geometric centers of the respective lever frames, said flexible suspension and fulcrum plates having transverse bending axes and with said lever frames providing the lateral rigidity of the weighing platform respecting said cross members, the said other end of said second lever frame also having flexible spaced, horizontal plates connected to the second end of said platform for securing said platform against endwise movement.

15. In a weighing system, a horizontal platform for supporting a given section of a material conveyor feeder belt moving successively over the first and second ends of said platform, stationary first and second cross members beneath said platform, first and second rectangular, rigid interfitting lever frames horizontally disposed beneath said platform and cross members, the oppositely disposed ends of said lever frames having counterweighted extensions and laterally spaced, horizontal, flexible fulcrum plates respectively connected to said cross members, the first and second ends of said platform having laterally spaced vertical, flexible suspension plates respectively connected to the oppositely disposed other ends of said first and second lever frames, weight sensing means pivotally connected to the geometric centers of the respective lever frames whereby the material weight supported by said platform tends to lift the counterweights of said extensions, said flexible suspension and fulcrum plates having transverse bending axes and with said lever frames providing the lateral rigidity of the weighing platform respecting said cross members, the said other end of said second lever frame also having flexible spaced, horizontal plates connected to the second end of said platform for securing said platform against endwise movement.

16. In a weighing system, a horizontal platform for supporting a given section of a material conveyor feeder belt moving successively over the first and second ends of said platform, stationary first and second cross members, first and second rectangular, rigid interfitting lever frames horizontally disposed beneath said platform and cross members, the oppositely disposed ends of said lever frames having counterweighted extensions and laterally spaced, horizontal, flexible fulcrum plates respectively connected to said cross members, the first and second ends of said platform having laterally spaced vertical, flexible suspension plates respectively connected to the oppositely disposed other ends of said first and second lever frames, and weight sensing means pivotally connected to the geometric centers of the respective lever frames whereby the material weight supported by said platform tends to lift the counterweights of said extensions and relieve said fulcrum plates of the weight carried by said fulcrum plates.

17. In a weighing system, a horizontal platform for supporting a given section of a conveyor feeder belt moving successively over the first and second ends of said platform, first and second rectangular, rigid interfitting lever frames horizontally disposed beneath said platform, weight sensing means pivotally connected to the geometric centers of the respective lever frames, fixed supporting cross members having laterally spaced, horizontal, flexible fulcrum plates respectively connected to the oppositely disposed ends of said first and second lever frames, the first and second ends of said platform having laterally spaced vertical, flexible suspension plates respectively connected to the oppositely disposed other ends of said first and second lever frames whereby an increase in the weight supported by said platform tends to relieve the weight supported by said fulcrum plates.

18. In a weighing system including a weight sensing device and a horizontal platform for supporting a given section of a conveyor feeder belt with said belt moving successively over the first and second ends of said platform, fixed first and second supporting cross members below and respectively nearer the second and first ends of said platform, a weigh beam intermediate said cross members and having a pivotal support at one end and a weight sensing device at the other end, first and second rectangular, rigid interfitting lever frames horizontally disposed beneath said weigh beam, laterally spaced, horizontal, flexible fulcrum plates respectively connecting the oppositely disposed ends of said first and second lever frames and said first and second cross members, laterally spaced vertical, flexible suspension plates respectively connecting the oppositely disposed other ends of said first and second lever frames with the first and second ends of said platform, adjacent flexure plates connecting the respective lever frames and said weigh beam, said suspension and fulcrum flexure plates having transverse bending axes and with said lever frames providing the lateral rigidity of the weighing platform respecting said cross members, and spaced, horizontal flexure plates connecting the said other end of said second lever frame and the second end of said platform and providing the longitudinal securement of said platform relative to said cross members.

References Cited
UNITED STATES PATENTS

| | | | |
|---|---|---|---|
| 1,014,604 | 1/1912 | Messiter | 177—16 |
| 2,285,719 | 6/1942 | Jerome et al. | 177—16 |
| 3,133,605 | 5/1964 | Christmann et al. | 177—16 |
| 3,163,248 | 12/1964 | Farquhar | 177—16 X |

RICHARD B. WILKINSON, *Primary Examiner.*

G. H. MILLER, *Assistant Examiner.*